US005790877A

United States Patent [19]
Nishiyama et al.

[11] Patent Number: 5,790,877
[45] Date of Patent: Aug. 4, 1998

[54] METHOD FOR CONTROLLING A PROCESSOR FOR POWER-SAVING IN A COMPUTER FOR EXECUTING A PROGRAM, COMPILER MEDIUM AND PROCESSOR SYSTEM

[75] Inventors: Hiroyasu Nishiyama, Kawasaki; Sumio Kikuchi, Machida; Noriyasu Mori, Kawasaki; Akira Nishimoto, Kawasaki; Yooichi Takeuchi, Kawasaki, all of Japan

[73] Assignee: Hitachi, Ltd., Tokyo, Japan

[21] Appl. No.: 675,033

[22] Filed: Jul. 3, 1996

[30] Foreign Application Priority Data

Jul. 6, 1995 [JP] Japan ................... 7-170675

[51] Int. Cl.⁶ ................... G06F 1/00; G06F 1/18; G06F 1/26
[52] U.S. Cl. ................... 395/750.05; 395/750.03; 395/750.06; 395/750.04; 364/707
[58] Field of Search ................... 395/750.01, 750.03, 395/750.04, 750.05, 750.08, 377, 381, 384, 588, 445, 452, 550, 556, 557; 364/707

[56] References Cited

U.S. PATENT DOCUMENTS

| | | | |
|---|---|---|---|
| 5,339,446 | 8/1994 | Yamasaki et al. | 395/750 |
| 5,390,350 | 2/1995 | Chung et al. | 364/707 |
| 5,418,969 | 5/1995 | Matsuzaki et al. | 395/750 |
| 5,432,947 | 7/1995 | Doi | 395/750 |
| 5,457,790 | 10/1995 | Iwamura et al. | 711/167 |
| 5,511,013 | 4/1996 | Tokieda et al. | 364/707 |
| 5,546,567 | 8/1996 | Nakamura | 395/550 |
| 5,560,017 | 9/1996 | Barrett et al. | 395/733 |
| 5,560,024 | 9/1996 | Harper et al. | 395/750 |
| 5,579,493 | 11/1996 | Kiuchi et al. | 395/376 |
| 5,630,148 | 5/1997 | Norris | 395/750 |
| 5,637,932 | 6/1997 | Koreeda et al. | 307/125 |
| 5,652,894 | 7/1997 | Hu et al. | 395/750 |

FOREIGN PATENT DOCUMENTS

| | | |
|---|---|---|
| A-3-116210 | of 0000 | Japan . |
| A-61-98426 | 5/1986 | Japan . |
| A-3-10306 | 1/1991 | Japan . |
| A-3-51902 | 3/1991 | Japan . |

OTHER PUBLICATIONS

S.C. Ellis, "The Low Power Intel 486 SL Microprocessor", 1993 IEEE, Session C: The PowerPC Microprocessor, pp. 96–102.

S. Gary, et al., "The PowerPC 603 Microprocessor, A Low–Power Design for Portable Applications" 1994 IEEE, pp. 307–315.

*Primary Examiner*—Ayaz R. Sheikh
*Assistant Examiner*—Raymond N. Phan
*Attorney, Agent, or Firm*—Antonelli, Terry, Stout & Kraus, LLP

[57] ABSTRACT

In a processor system including a plurality of hardware resources, a method for arranging a program to suppress the power consumption by the resources includes the steps of determining which ones of the hardware resources are to be operated and from which instruction cycle to which instruction cycle to execute each instruction of the program; and based on the determination, adding an instruction to lower frequencies of clock signals inputted to the hardware resources and an instruction to restore the frequency at positions adjacent to the beginning and the end of the period during which the hardware resources are not operated and compiling the program. The processor system decodes the compiled program and lowers the frequency of the clock signal inputted to the hardware resources in accordance with the frequency lowering instruction and the frequency restoring instruction detected in the decoding step. The clock signals sent to the hardware resources are stopped by the frequency lowering instruction to the resource of the hardware resources for which the clock frequency may be lowered to zero.

17 Claims, 6 Drawing Sheets

RESOURCE UTILIZATION TABLE 504

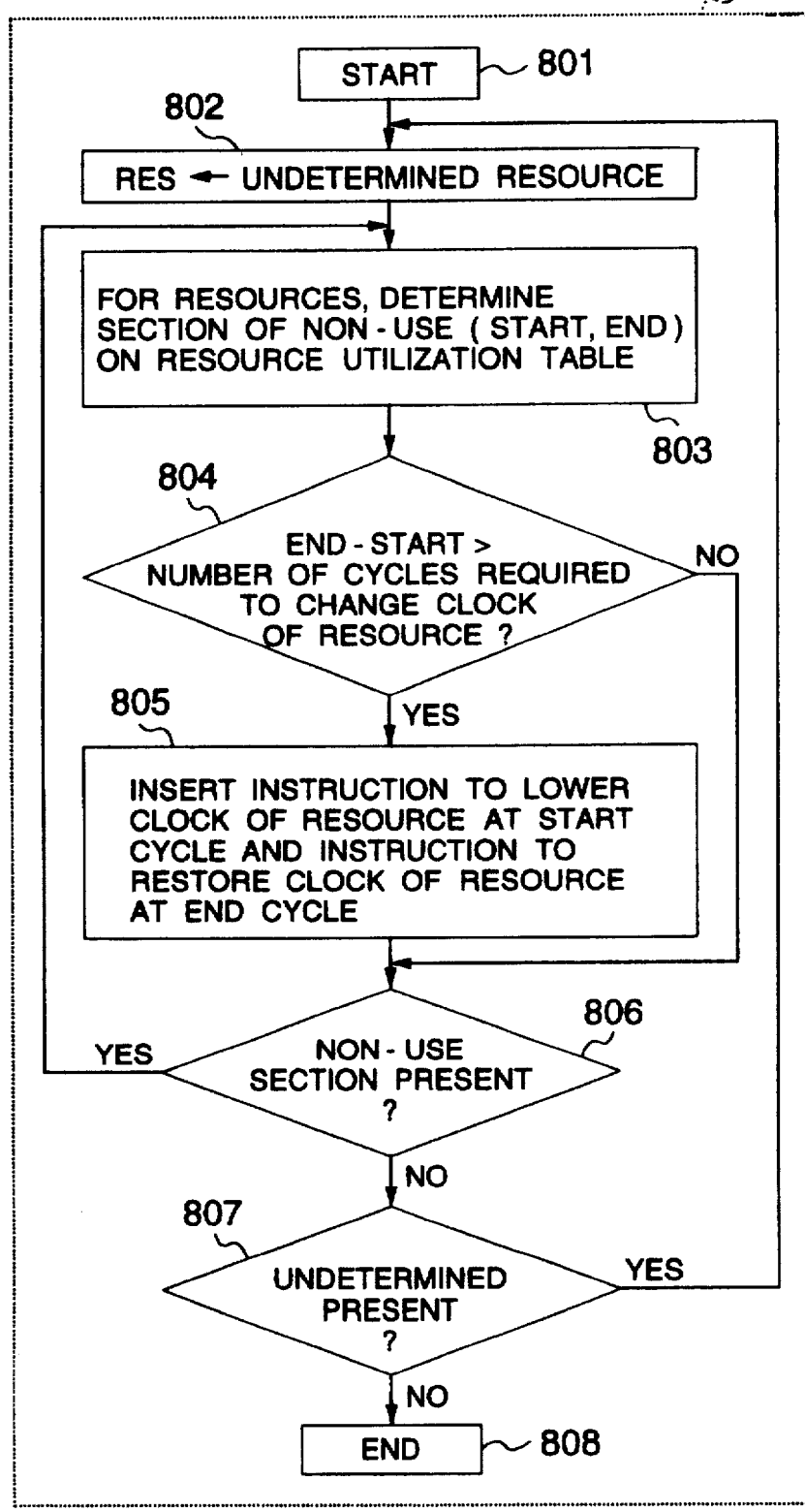

1

METHOD FOR CONTROLLING A PROCESSOR FOR POWER-SAVING IN A COMPUTER FOR EXECUTING A PROGRAM, COMPILER MEDIUM AND PROCESSOR SYSTEM

BACKGROUND OF THE INVENTION

The present invention relates to a processor system for enabling power saving in a microprocessor, a method therefor, a method for executing a selective resource at a high speed and a method for controlling power saving in a microprogramming language compiler.

In general, a microprocessor comprises a CMOS circuit so that power consumption of the processor increases proportionally to a clock frequency of the microprocessor. Thus, several methods for reducing the power consumption have been proposed heretofore as shown below.

"Low Power Microprocessor" of an application Ser. No. 136,990 filed on Oct. 18, 1993 which is now issued to Iwamura et al as U.S. Pat. No. 5,457,790.

JP-A-3-116210 discloses an instruction for ceasing to provide a clock signal to one of a CMOS logical circuits.

JP-A-3-51902 discloses a method for reducing power consumption by providing frequency divider means for converting a clock frequency of an overall processor to a lower frequency when an amount of program to be processed by the processor is small.

JP-A-3-10306 discloses a method for supplying a clock to only functional blocks required to execute decoded instructions in a processor which conducts pipeline processing.

JP-A-61-98426 discloses means for switching an operating frequency of a microprocessor between a high frequency and a low frequency by an instruction.

In the prior art techniques of JP-A-3-51902 and JP-A-3-10306 which change the clock frequency of the overall processor depending on the load, the power consumption can be reduced only when the amount of program to be processed by the processor is small because the clock frequency of the overall processor is changed.

In the prior art techniques of JP-A-3-51902 and JP-A-3-10306, the hardware to control the clock is complex because the control of the clock generator should be conducted by hardware.

In the prior art technique of JP-A-3-10306, the power consumption cannot be reduced for a circuit which should maintain a status by the clock supply because the supply of the clock to the functional block which is not used by the instruction is stopped.

Further, S. C. Ellis, "The Low Power Intel486 SL Microprocessor", 1993 IEEE, Section C: The Power PC Microprocessor, pp. 96–102, and S. Cary, et al., "The Power PC 603 Microprocessor, A Low-Power Design Portable Applications", 1994 IEEE, pp. 307–315 disclose techniques for reducing power consumption or power management.

SUMMARY OF THE INVENTION

It is an object of the present invention to a processor which allows to effectively reduce power consumption without regard to the amount of program to be processed without making the hardware complex and which executes instructions at a high speed during non-use period of a portion of resources, a method for controlling the processor and a medium storing a code section for the control.

In order to achieve the object of the present invention, the present invention provides a control method in a processor system having a plurality of hardware resources, comprises the steps of determining which ones of the hardware resources are to be operated and from which instruction cycle to which instruction cycle to execute each instruction of the program; and based on the determination, adding an instruction to lower frequencies of clock signals inputted to the hardware resources and an instruction to restore the frequency at positions adjacent to the beginning and the end of the period during which the hardware resources are not operated when compiling the program.

The frequencies of the clock signals inputted to the hardware resources are lowered in accordance with the frequency lowering instruction and the frequency restoring instruction detected in the decoding step.

The clock signals sent to the hardware resources are stopped by the frequency lowering instruction to the resource of the hardware resources for which the clock frequency may be lowered to zero.

In the determination step, the use/non-use of the respective resources are stored in two-dimension array of the resource utilization table in time sequence.

A storage medium including a code is connected to a computer system and a program is compiled to an object program using the code for execution by a processor system having a plurality of hardware resources, the storage medium comprising a code section representing a function to determine which ones of the hardware resources are to be operated and from which instruction cycle to which instruction cycle to execute each instruction of a program, and a code section representing a function to add an instruction to lower frequencies of clock signals inputted to the hardware resources and an instruction to restore the frequencies at positions adjacent to the beginning and end instruction cycles of a period during which the hardware resources are not operated, based on the determination and compiling the program.

As for the relation between the hardware and the software, (a) the processor is provided with means for controlling the clock inputs to the hardware resources such as register files and the arithmetic and logical operation units of the CPU individually by the instructions, and (b) the hardware resources required for the execution of each instruction of the program are detected by the compiler during the compilation and the instruction to stop the clock inputs to the hardware resources not required for the execution of the program or to lower the frequency is generated, so that the power consumption of the processor is reduced and the processor may be operated at a higher frequency at a higher speed when the hardware resources having a low rated operation frequency are not used.

In accordance with the processor and the control method therefor of the present invention, the frequency of the hardware resource which is not required or for which high speed in not required for the operation of the processor is individually set low by the compiler to suppress the power consumption of the overall processor low. In this case, since the frequency of the input clock to other hardware resources is not affected, the power consumption may be reduced without lowering the processing speed of the processor.

Further, when it is not required to use the hardware resource which does not operate at the input clock higher than a predetermined frequency, the other hardware resources may be operated at a higher frequency to increase the processing speed of the processor.

As described above, in accordance with the present invention, the hardware resource which is required for the execution of the instructions of the program is detected at the compiling and the frequency of the input clock of the hardware resources is controlled by the instructions. Thus, in order to achieve the above function, it is only needed to add a clock control circuit for controlling the clocks of the functional unit and a function in the instruction decode to recognize the instruction to change the clocks of the functional units to operate the clock control circuit, a large amount of hardware required in the prior art is not needed.

BRIEF DESCRIPTION OF THE DRAWINGS

FIG. 8 shows a flow chart of a clock control instruction insertion unit.

DETAILED DESCRIPTION OF THE PREFERRED EMBODIMENTS

One embodiment of the present invention is now explained with reference to the drawings. In the present embodiment, a processor of a VLIW (very long instruction word) type which can simultaneously or individually control a plurality of hardware is explained although the present invention is not limited to the processor of the VLIW type but it is equally applicable to a conventional processor of a RISC or CISC type.

Figure 1:
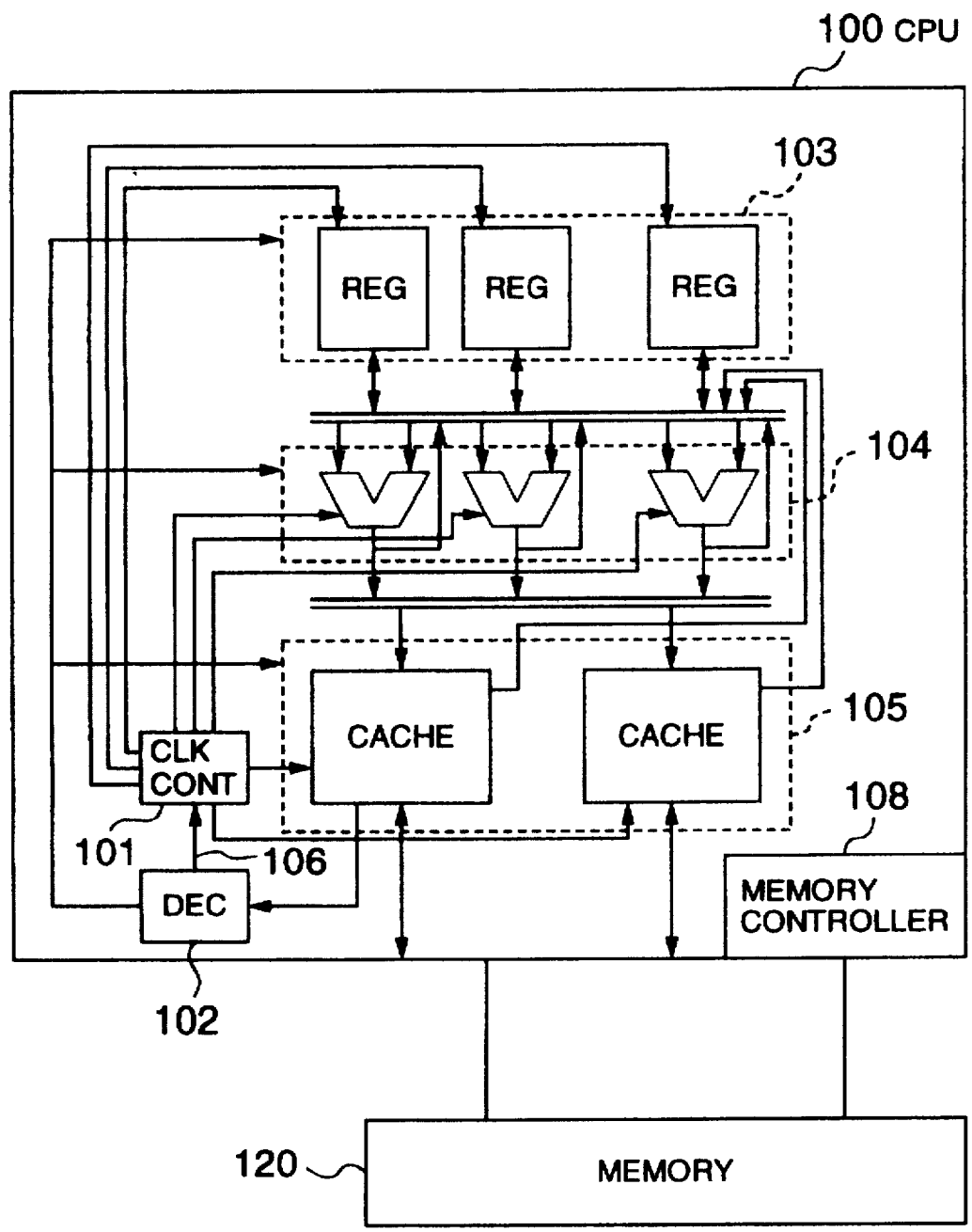
FIG. 1 shows a processor according to the present invention.

FIG. 1 shows a microprocessor according to the present invention. A processor 100 comprises a clock control circuit 100 for controlling an input clock to each hardware resource. A plurality of register files 103, arithmetic and logical operation units 104 and cache memories 105 are connected to the clock control circuit 101 through the respective clock inputs. A memory 120 is controlled by a memory controller 108 and connected to the caches 105. An instruction decoder 102 executes instructions by using the arithmetic and logical operation units 104 in a manner similar to that of a conventional microprocessor, and when it recognizes a clock control instruction, it sends over a signal line 106 to the clock control circuit 101 a control signal representing the number of the hardware resource for which the clock is to be changed and the frequency of the clock to which the frequency is changed or the number representing such frequency, to change the frequency of the input clocks of the designated hardware resources. The clock signals of the predetermined frequency are continuously supplied to the instruction decoder, the memory controller and the memory and they need not be controlled for the clock frequency.

In this manner, in the present invention, the input clock frequencies to the hardware resources can be individually changed by executing the instruction to control the clock control circuit 101.

When the suppression of the memory reference is executed by the hardware shown in FIG. 1, the input clock to the cache memory 105 from the clock control circuit 101 is stopped or lowered. For the CMOS processor, the power consumption increase approximately proportionally to the frequency as described above. Thus, the power consumption by the cache memory 105 can be reduced in the present invention.

In the present embodiment, assuming that a maximum operation frequency of the cache memory 104 is 100 MHz and a maximum operation frequency of the other hardware resources is 200 MHz, the input clock frequency to the respective hardware resources is set to 100 MHz when the accessing to the cache memories is conducted and the input clock frequency to the hardware resources other than the cache memories is set to 200 MHz when the accessing to the cache memories is not conducted so that the processing when the accessing to the cache memories is not conducted can be conducted at a speed of two times as high as that of the normal speed.

Figure 2:
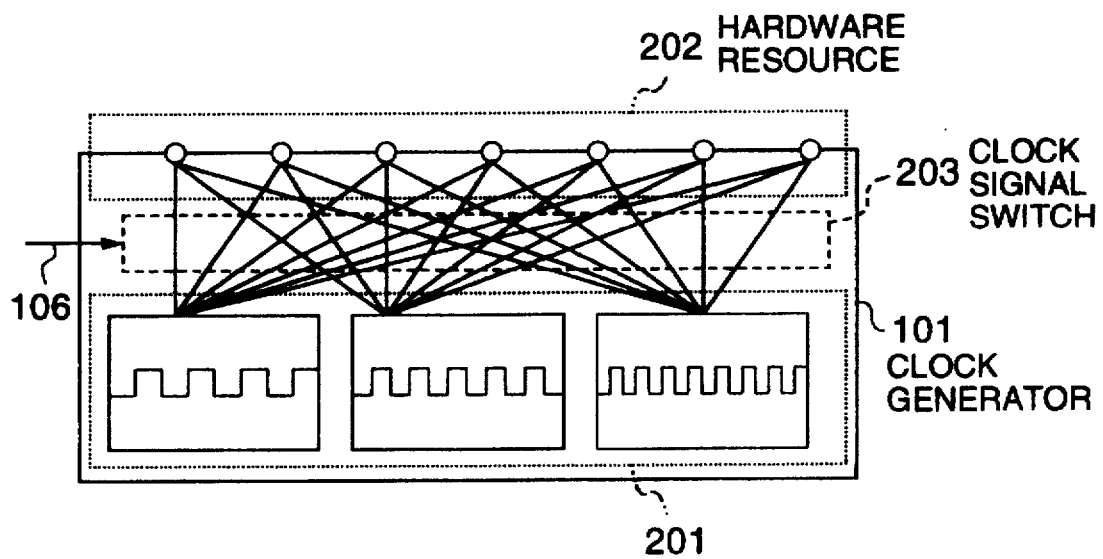
FIG. 2 shows a clock control circuit.

FIG. 2 shows an embodiment of the clock control circuit 101. In the present embodiment, a plurality of clock generators 201 of different frequencies are coupled to the input signal lines of the respective hardware resources 202 and interconnected by a selection switch by instructions through the signal line 106. By changing the connection by the instruction, the input clocks of the respective hardware resources may be changed to receive the clock from different one of the clock generators 201. When the hardware resource 202 is not connected to the clock generator 201, the input clock of that hardware resource is stopped. In implementing the clock control circuit 101, other methods such as providing a multi-frequency dividable clock for each hardware resource may be used.

Figure 3:
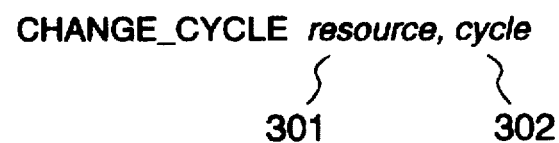
FIG. 3 shows a clock control instruction.

FIG. 3 shows an embodiment of an instruction to change the frequency of the designated hardware resource. In this instruction, the input clock frequency of the resource designated by a resource designation operand "resource" 301 for one of the hardware resources of the processor such as the register files 103, the arithmetic and logical operation units 104 and the cache memories 105 shown in FIG. 1 is changed to the frequency designated by a clock frequency designation operand "cycle" 302.

Figure 4:
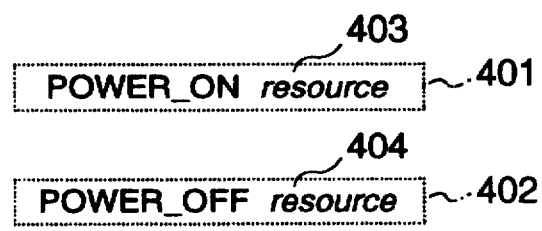
FIG. 4 shows a specialized clock control instruction.

In a specialized form of the present instruction, the frequencies which can be set by the instruction to change the clock frequency may be limited to 0 Hz and a maximum operation frequency of the overall processor and one of two instructions as shown in FIG. 4 may be issued. In FIG. 4, the clock input is started prior to the start of the use of the hardware resource by an instruction 401 to start the clock input to hardware resource designated by the resource designation operand 403 and an instruction 402 to stop the clock input to the hardware resource designated by the resource designation operand 404, and the clock input is stopped when the use of the hardware resources is terminated so that the power consumption is reduced. Those instructions may also be used when the clocks are limited to the high and low frequencies.

Figures 5, 6:
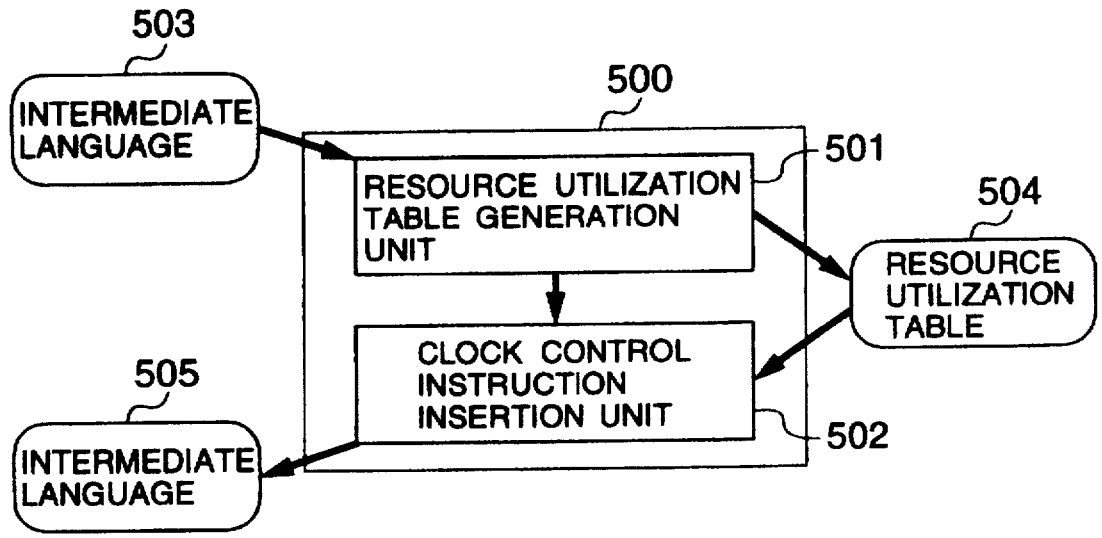
FIG. 5 shows a configuration of a clock cycle change instruction generation unit of a compiler.
FIG. 6 shows a resource utilization table.

FIG. 5 shows a configuration of an instruction generation unit of a compiler for generating the instruction to change the clock frequency shown in FIG. 3 or FIG. 4. In FIG. 5, an insertion phase 500 of the clock frequency change instruction receives a well-known intermediate language 503 which is converted from a source language and does not contain the clock frequency change instruction and produces an intermediate language 505 which includes the clock cycle change instruction. A resource utilization table 504 contains a record of the utilization of the hardware resources in particular cycles in the program execution. In the insertion phase 500 of the clock frequency change instruction, a resource utilization table 504 for the intermediate language is prepared by the resource utilization table preparation unit 501 and an intermediate language 505 having the clock frequency change instruction inserted by the clock control instruction insertion unit 502 is generated by referring the table 504. The intermediate language is converted to an object code in a well-known manner.

FIG. 6 show the resource utilization table 504. In FIG. 6, an abscissa represents the resource of the hardware which can control the clock and an ordinate represents the execution cycle. In FIG. 6, a column with dot indicates that the corresponding hardware resource is used in that cycle.

Figure 7:
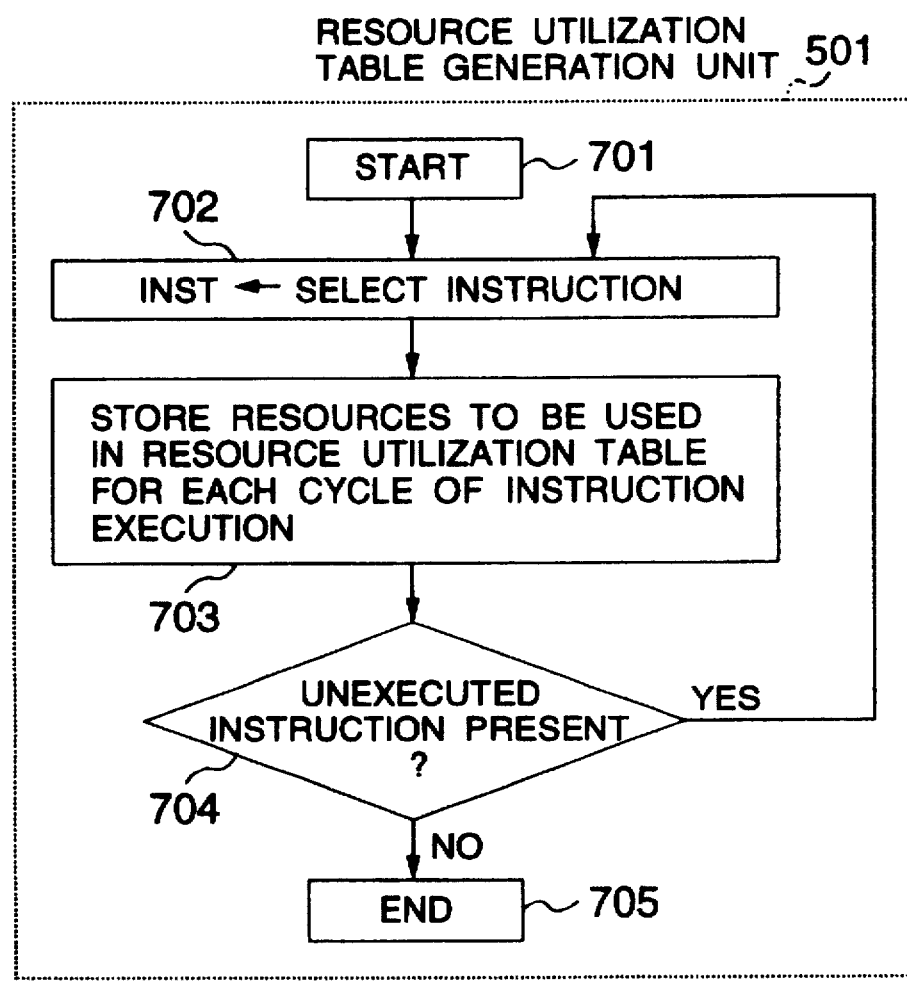
FIG. 7 shows a flow chart of a resource utilization table generation unit.

FIG. 7 shows a flow chart of the resource utilization table generation unit 501. In the resource utilization table generation unit 501, an instruction included in the intermediate language is selected in a step 702, and the hardware resources used in the respective cycles by the selected instruction in the respective cycles of the program execution are detected by the operation code of the instruction and the operands in a step 703, and they are stored in the resource utilization table 504. In a step 704, if unexecuted instructions are included in the intermediate language, the step 702 is executed again and if they are not included, the process is terminated (step 705).

FIG. 8 shows flow chart of the clock control instruction insertion field 502. The clock control instruction insertion unit 502 starts the process in a step 801, and selects one hardware resource in a step 802. In a step 803, a section of cycle not used by the selected resource is determined by referring the resource utilization table. In a step 804, whether the number of cycles not used by the resource is larger than the number of cycles required to change the clock or not is determined. If the number of cycles not used by the resource is larger, the process proceeds to a step 806, other wise the process proceeds to a step 806. In the step 805, an instruction to lower the clock frequency of the hardware resource is inserted at the beginning of the determined non-use section and an instruction to restore the clock frequency is inserted at the end of the non-use section. In the step 806, whether the non-use section of the hardware resource is present or not is determined, and if it is present, the process proceeds to the step 803, other wise the process proceeds to a step 807. In the step 807, whether unprocessed hardware resource is present or not is determined, and if it is present, the process proceeds the step 802, other wise the process proceeds to a step 808. The compiler comprises the program shown in the flow chart and the resource utilization table and it operates on the memory.

Figure 9A:
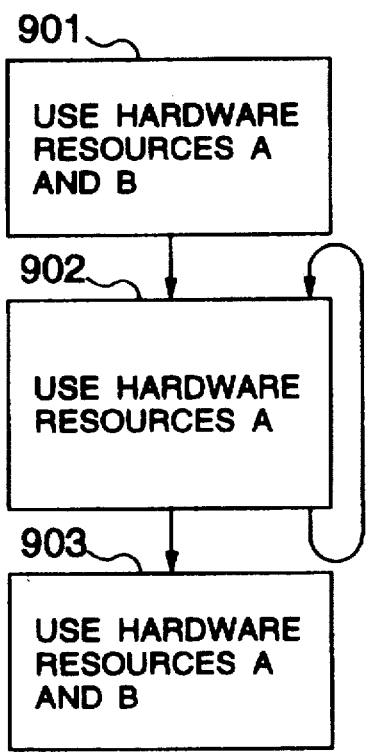
FIGS. 9A and 9B show flow charts of use of the clock control instruction, and FIGS. 10A and 10B a clock control system which is constructed by connecting a storage medium storing a compiler of the present invention to a CPU.
Figure 9B:
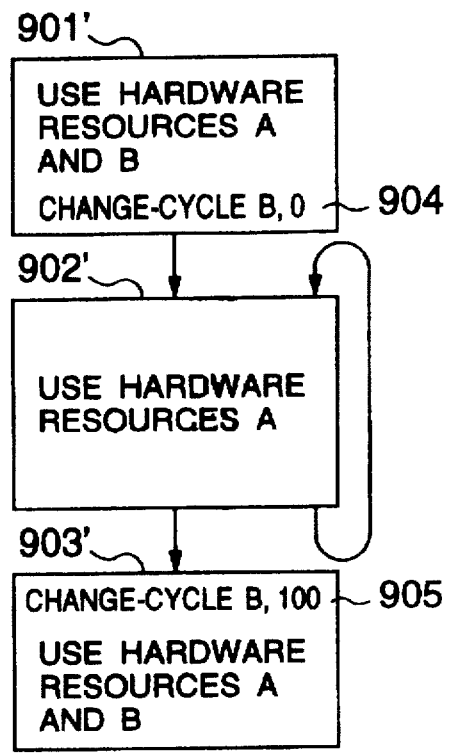

Assuming that, as shown in FIG. 9A, the hardware resources A and B are controlled for the clock, the loop 902 uses the hardware resource A only and the loop entry 901 and the loop exit 903 use the hardware resources A and B, it is seen from the resource utilization table that the resource B is not used in the loop body 902 and the instruction 905 to lower the clock frequency of the resource B is inserted immediately before the loop entry and the instruction 904 to restore the clock frequency of the resource B is inserted immediately after the loop exit as shown in FIG. 9B. Thus, during the execution of the loop 902, the power consumption by the hardware resource B is reduced.

In the process of the clock control instruction insertion unit 502, the clock control instruction is inserted to reduce the power consumption by the non-used hardware resources as much as possible. In some cases, the number of execution cycles may increase by the insertion of the clock control instruction due to the limitation of the simultaneously executed respectively in a plurality of processors. In such a case, when the clock control instruction is inserted in the step 805 of FIG. 8, whether the number of cycles increases or not may be checked in the step 804.

In accordance with the present invention, when the hardware resources of the microprocessor are not required for the processing, the input clocks of the respective hardware resources are changed by the clock change instruction to set lower frequency clocks so that the power consumption is reduced. When it is not required to use the hardware resources which do not operate above the predetermined cycles, the clock frequencies of the hardware resources other than that hardware resource are set high to allow high speed processing.

Figure 10A:
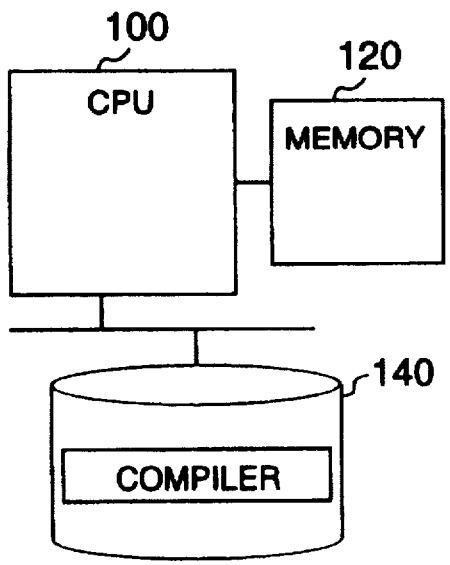
Figure 10B:
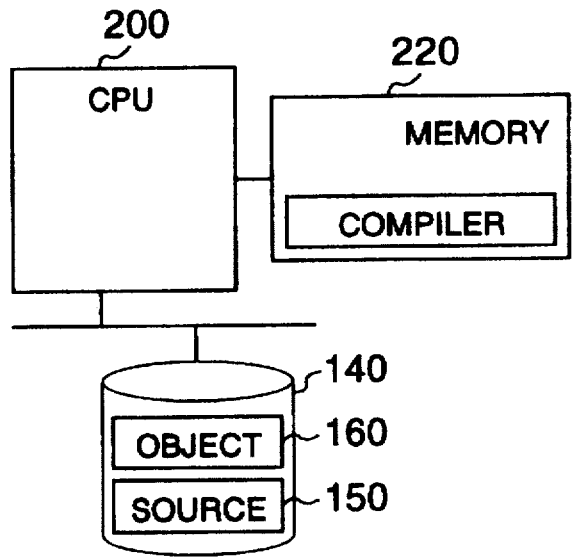

FIG. 10A shows a system configuration in which the file 140 including the compiler containing the program shown in FIGS. 7 and 8 is connected to the CPU 100 shown in FIG. 1. The compiler file 140 may be loaded off the CPU 100 and it may be connected to a CPU 200 having the clock control hardware as described above to prepare the compiler function in the memory 220 and compile the source code 150 to attain the object code 160 with the power saving function.

The substantial content of the compiler 140 may be transferred from the CPU 100 to the CPU 200 over the communication line to attain the object code 160 with the power saving function to construct the power-saving processor system.

In an alternative embodiment of the present invention, the change instruction including the operand cycle shown in FIG. 3 may be used to provide a function of sending at an intermediate speed in addition to the high speed clock for the used resource and the low speed clock for the non-use clock. When the job is compiled by the compiler and the total execution time of the job is substantially shorter than a predetermined limit time, the intermediate speed clock may be sent to the resource used for the execution of the job and the low speed clock may be sent to the non-use resources so that the power saving is attained by the suppression of the excess functions.

What is claimed is:

1. In a processor system comprising a plurality of hardware resources, a method for arranging a program to suppress the power consumption by the hardware resources, comprising the steps of:
    determining which ones of the hardware resources are to be operated and from which instruction cycle to which instruction cycle to execute each instruction of the program; and
    based on the determination, adding an instruction to lower frequencies of clock signals inputted to the hardware resources and an instruction to restore the frequency at positions adjacent to the beginning and then of the period during which the hardware resources are not operated and compiling the program.

2. A method for arranging a program according to claim 1 further comprising the steps of:
    decoding the compiled program; and
    lowering and restoring the frequency of the clock signal inputted to the hardware resources in accordance with the frequency lowering instruction and the frequency restoring instruction detected in the decoding step.

3. A method for arranging a program according to claim 2 wherein the clock signals sent to the hardware resources are stopped by the frequency lowering instruction to the resource for which the clock frequency may be lowered to zero.

4. A method for arranging a program according to claim 3 wherein the frequency lowering instruction and the frequency restoring instruction in the compile step are OFF instruction and ON instruction designating resources in operands.

5. A method for arranging a program according to claim 1 wherein the frequency lowering instruction and the frequency restoring instruction of the compile step are frequency change instructions to designate a hardware resource and a frequency of operands.

6. A method for arranging a program according to claim 1 further comprising the steps of:

preparing a resource utilization table having the hardware resources and a series of clock cycles for providing timing signals to operate the resources arranged in two-dimensionally; and storing the use/non-use of the respective. resources in time sequence in the determination step in the two-dimension array of the resource utilization table.

7. A processor system for suppressing power consumption in resources comprising:

a plurality of hardware resources;

means for determining which ones of the hardware resources are to be operated and from which instruction cycle to which instruction cycle to execute each instruction of a program; and means responsive to the determination for adding an instruction to lower frequencies of clock signals inputted to the hardware resources and an instruction to restore the frequency at positions adjacent to the beginning and the end of the period during which the hardware resources are not operated and compiling the program.

8. A processor system according to claim 7 further comprising:

means for decoding the compiled program; and means for lowering the frequency of the clock signal inputted to the hardware resources in accordance with the frequency lowering instruction and the frequency restoring instruction detected by the decoding means.

9. A processor system according to claim 8 further comprising means for stopping the clock signals sent to the hardware resources by the frequency lowering instruction to the resource of the hardware resources for which the clock frequency may be lowered to zero.

10. A processor system according to claim 9 wherein the frequency lowering instruction and the frequency restoring instruction in the compile step are OFF instruction and ON instruction designating resources in operands.

11. A processor system according to claim 7 wherein the frequency lowering instruction and the frequency restoring instruction of the compile step are frequency change instructions to designate a hardware resource and a frequency of operands.

12. A processor system according to claim 7 wherein the hardware resources includes a first register and a first arithmetic and logical operation unit used for a floating point operation and a second register and a second arithmetic and logical operation unit for a fixed point operation, the clock signals to the second register and the second arithmetic and logical operation unit are stopped during the floating point operation, and the clock signals to the first register and the first arithmetic and logical operation unit are stopped during the fixed point operation.

13. A processor system according to claim 7 wherein the hardware resources include a first cache memory used for a floating point operation, a second cache memory used for a fixed point operation, and the frequency of the clock signal to the second cache memory is lowered during the floating point operation and the frequency of the clock signal to the first cache memory is lowered during the fixed point operation.

14. A storage medium to be connected to a processor system having a plurality of hardware resources and including a code to be read and executed by the processor, comprising:

a code section representing a function to determine which ones of the hardware resources are to be operated and from which instruction cycle to which instruction cycle to execute each instruction of a program; and a code section representing a function to add an instruction to lower frequencies of clock signals inputted to the hardware resources and an instruction to restore the frequencies at positions adjacent to the beginning and end instruction cycles of a period during which the hardware resources are not operated, based on the determination and compiling the program.

15. A storage medium according to claim 14 wherein the frequency lowering instruction and the frequency restoring instruction in the compile step are OFF instruction and ON instruction designating resources in operands.

16. A storage medium according to claim 14 wherein the frequency lowering instruction and the frequency restoring instruction of the compile step are frequency change instructions to designate a hardware resource and a frequency of operands.

17. A storage medium according to claim 14 wherein the code includes a code section for representing a function to add an instruction to designate an intermediate speed clock when a total execution time of the program is substantially shorter than a predetermined limit time.

* * * * *